June 24, 1969    A. J. SIPIN    3,451,460

SKID-RESISTING SYSTEMS

Filed Oct. 7, 1966    Sheet 1 of 2

INVENTOR.
Anatole J. Sipin

United States Patent Office 3,451,460
Patented June 24, 1969

3,451,460
SKID-RESISTING SYSTEMS
Anatole J. Sipin, 177 E. 77th St.,
New York, N.Y. 10021
Filed Oct. 7, 1966, Ser. No. 585,212
Int. Cl. B60c 23/10, 29/00
U.S. Cl. 152—417                    10 Claims

ABSTRACT OF THE DISCLOSURE

A skid-resisting system, including an inflatable tire with an internal annular volume divided by transverse members into a plurality of chambers, in which traction is controlled by segmentally varying the resilience along the circumference of the tire by differential pressurization of alternate sets of chambers.

---

This invention relates to a system for resisting skids and slippage of vehicle wheels by pneumatically controlling their tractive characteristics.

Various means have heretofore been utilized to improve the traction of vehicle wheels on slippery surfaces. Metal chains are frequently attached to the periphery of pneumatic tires to increase traction by periodically increasing the rolling radius, causing a slight rise and fall in the center of rotation. Such chains are effective on slippery surfaces such as icy roads; but they are objectionable on clear pavement by impeding vehicle motion, causing vibration, and damaging the road. Deep rubber treads on pneumatic tires, such as "snow tires," are popular as they provide improved traction in snow and mud and can be used on clear pavement with only minor loss of efficiency. The improvement in traction, however, is limited; the tires perform poorly on ice, and they produce objectionable vibration and noise on clear pavement. Recently, tires have been made available with metal pins driven into the tread to improve traction. These permit higher speeds than do chains; but they suffer from similar drawbacks on clear pavement and are damaging to road surfaces. Experimental vehicles have been proposed and built with non-circular wheels, increasing traction by continuous change in the center of rotation; but these again are limited in application.

None of the means described are capable of varying the wheel traction during operation to adapt to surface conditions.

It is an object of this invention to provide a system for varying the tractive characteristics of a vehicle wheel so as to resist skids and slipping under unfavorable surface conditions.

It is another object of this invention to provide such a system which is remotely operable in order to achieve rapid variation of the tractive characteristics of the wheel and to maintain vehicle performance under rapidly varying road conditions.

It is a third object of this invention to provide a skid-resisting system in which traction is controlled by varying the resilience along the circumference of a pneumatic tire.

It is a fourth object of this invention to achieve a skid-resisting system including a pneumatic tire which provides protection against blow-outs as well as skids and slipping.

The invention is a skid-resisting system in which traction is controlled by segmentally varying the resilience along the circumference of an inflatable tire with an internal annular volume divided by transverse members into a plurality of chambers. Such a tire is hereinafter called a segmented tire. One set of alternately spaced chambers is connected to a single source of pneumatic pressure; and the other alternately spaced chambers are connected to another source of pressure. To increase tractive resistance of the tire, one of the sources is brought to a different pressure level than the other so that adjacent chambers are at different pressures. This effectively creates the pneumatic equivalent of a polygonal wheel; the "corners" being formed at the transitions between the chambers; and the increase in traction is due to the change in the center of rotation as the tire rolls upon consecutive chambers. When the vehicle is travelling on a clear, dry pavement, the two pressure sources are brought to the same pressure level; and the tire performs as a conventional tire, with minimal tractive resistance.

Different embodiments of the invention are described hereinafter in connection with the following drawings, disclosing various specific features and advantages.

Figure 1:
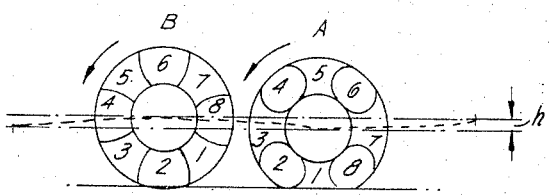
FIG. 1 is a schematic diagram, illustrating the principle of operation of the invention.

Referring now to FIG. 1, the motion of a segmented tire, pressurized in accordance with the principle of this invention to provide increased traction, is shown by the successive positions, A and B. The tire shown in FIG. 1 has eight transverse members dividing the annular tire volume into eight chambers. Alternate chambers 2, 4, 6 and 8 are connected to a common high air pressure. In position A, low pressure chamber 1 is in contact with the ground; and the vehicle weight flattens the tire to a degree so that the wheel center is at its lowest height above the ground. As the wheel rolls, its center describes a periodic trajectory, with a displacement $h$ in height determined by the relative pressures in the two sets of chambers. This periodic shift in the center of rotation causes improved traction similar to that provided by an octagonal wheel or tire chains. Eight chambers are shown strictly for purposes of illustration, it being understood that any number of chambers can be utilized in the tire construction. Also, it is not necessary that all tire chambers be of the same peripheral length. For example, the chambers of one set, say, chambers 2, 4, 6, 8 can be longer than the chambers of the other set, i.e., 1, 3, 5, 7.

Figure 2:
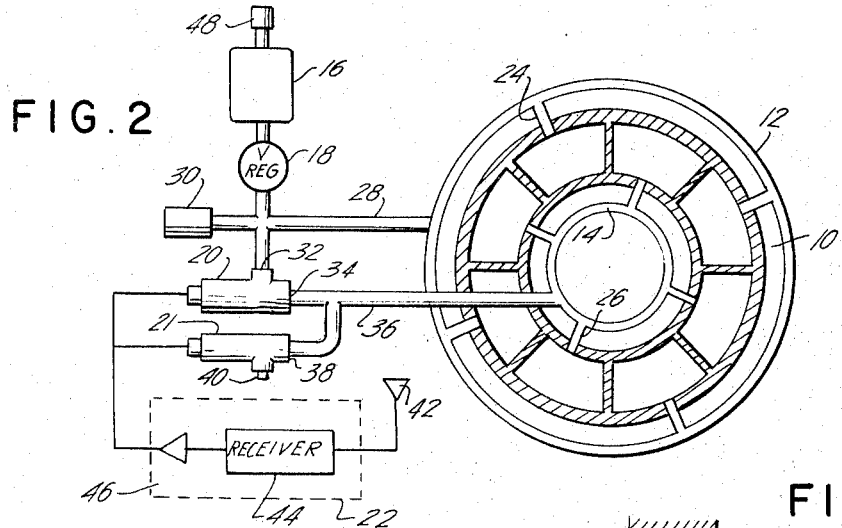
FIG. 2 is a schematic drawing of the skid resisting system, showing essential details incorporated into a system requiring no rotary joints.

The skid-resisting system shown in FIG. 2 consists of a segmented tire 10, two air manifolds, 12 and 14, an air reservoir 16 and pressure regulating valve 18, two solenoid valves 20 and 21 and a remotely actuated controller 22. Manifold 12 is connected to one set of alternately spaced chambers in the tire through passages 24. Manifold 14 is connected to the other set of alternately spaced chambers through passages 26. Pressure regulating valve 18 is connected to the outlet of air reservoir 16 and supplies air at constant pressure to manifold 12 through duct 28. Duct 28 is also connected to a pressurizing check valve of a type commonly used for tire inflation. Duct 28 is also connected to one port 32 of solenoid valve 20.

The other port 34 of solenoid valve 20 is connected to manifold 14 through duct 36. Duct 36 is also connected to one port 38 of solenoid valve 21. The other port 40 of solenoid valve 21 is exposed to atmosphere. The pressure regulating valve, 18, is of a conventional type in which the outlet pressure is balanced against a spring-loaded piston, which positions the valve element. An example is the Model RV.31 pressure regulator manufactured by the Marota Valve Corporation of Boonton, N.J. Controller 22 includes an antenna 42, a telecommunications receiver 44 and an amplifier 46 the receiver can be of a conventional type, including those used for remote control of aircraft. Typical is a transistorized VHF, FM receiver and command decoder made by R S Electronics Corp. of Sunnyvale, Calif. Each command is decoded as an audio tone, which can be rectified to supply a positive or negative signal to the amplifier. A battery power supply is understood to be included in either of the active elements. The output of the amplifier is connected to the coils of both solenoid valves. Both solenoid valves are normally closed. Solenoid valve 20 is energized by a positive signal from the amplifier. Solenoid valve 21 is energized by a negative signal from the amplifier. The air reservoir, valves and controller all revolve with the wheel, eliminating any need for rotary pressure joints.

In operation, the set of tire chambers connected to manifold 12 through passages 24 is always pressurized at an air pressure level determined by the setting of the regulating valve 18. The pressure in the other set of tire chambers is controlled by solenoid valves 20 and 21. When a command signal to increase traction is received by the controller, a negative voltage from amplifier 46 energizes solenoid valve 21, exhausting manifold 14 and the tire chambers connected to it through passages 26. When the traction has increased to a required level, the signal is removed and solenoid valve 21 closes, retaining the new and lower level of pressure in manifold 14. When it is desired to reduce rolling resistance of the wheel, a command signal is transmitted to the controller to provide a positive output from amplifier 46, energizing solenoid valve 20, connecting ducts 28 and 36 and pressurizing manifold 14 until the traction has been reduced by the required amount. It is to be understood that any type of command transmission can be used, including systems using electromagnetic or ultrasonic radiations.

Check valve 48 is provided for charging air reservoir 16.

Figure 3:
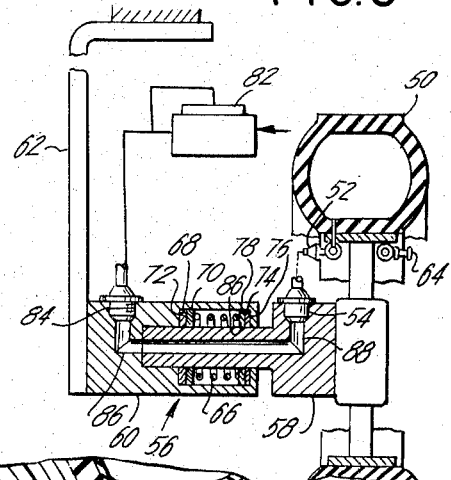
FIG. 3 is a schematic drawing of a skid resisting system utilizing a single rotary joint to pressurize one set of alternately spaced chambers in a segmented tire.

FIG. 3 shows a segmented tire of similar construction to the one shown in FIG. 2, and having two manifolds, in a system where a variable air pressure, applied to one of the two manifolds is transmitted through a rotary joint. Tire 50 has one set of chambers and their associated manifold connected through fitting 52 to port 54 or rotary pressure joint 56, whose rotating member 58 is centrally mounted on the hub of the wheel, which retains tire 50. The non-rotating member 60 of rotary joint 56 is mounted to the vehicle through bracket 62. The other set of chambers and their associated manifold are terminated in a tire inflating check valve 64 of conventional construction, which is exposed to atmosphere.

Rotating member 58 and non-rotating member 60 of rotary joint 56 are held in close contact through the action of compression spring 66. The primary air seal between the pressurized air in rotary joint 56 and atmosphere is provided by ring 68, which is pressed by shoulder 70 of rotating member 58 against surface 72 of member 60. Ring 68 is made of carbon, Teflon or similar material with a low coefficient of friction and good sealing properties. A secondary seal is provided by ring 74, which is pressed by spring 66 against surface 76 of member 60. Ring 74 is identical with ring 68 in material and dimensions. A washer 78 is located between ring 74 and spring 66 to prevent damage to the seal.

In operation, air is supplied from a compressor or tank on the vehicle to an adjustable pressure regulating valve 82, which delivers air at the selected regulated pressure to port 84 and passage 86 of non-rotating member 60, passage 88 and port 54 of rotating member 58 and, finally, fitting 52 on tire 50. The manifold and chambers connected to check valve 64 are pre-charged to a constant pressure. Pressure in the set of chambers connected to fitting 52 is varied by adjustment of regulating valve 82 to increase or decrease traction of tire 50. The regulating valve can be mounted on the control panel of the cab in the vehicle for easy manipulation by the driver or other operator.

Figure 4:
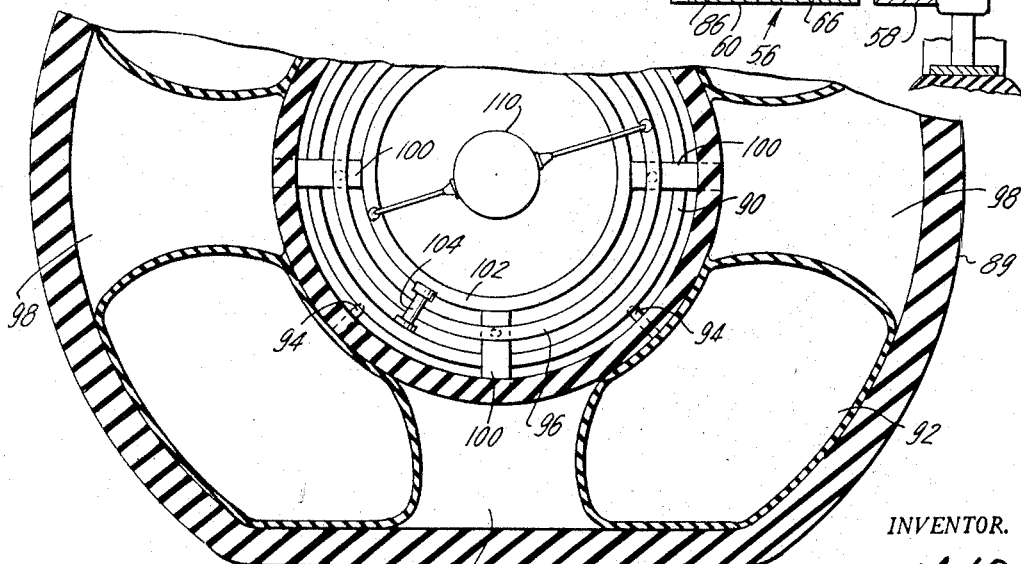
FIG. 4 is a fragmentary sectional view of a segmented tire with three air manifolds in which two of the manifolds are pressurized through a dual rotary joint.
Figure 5:
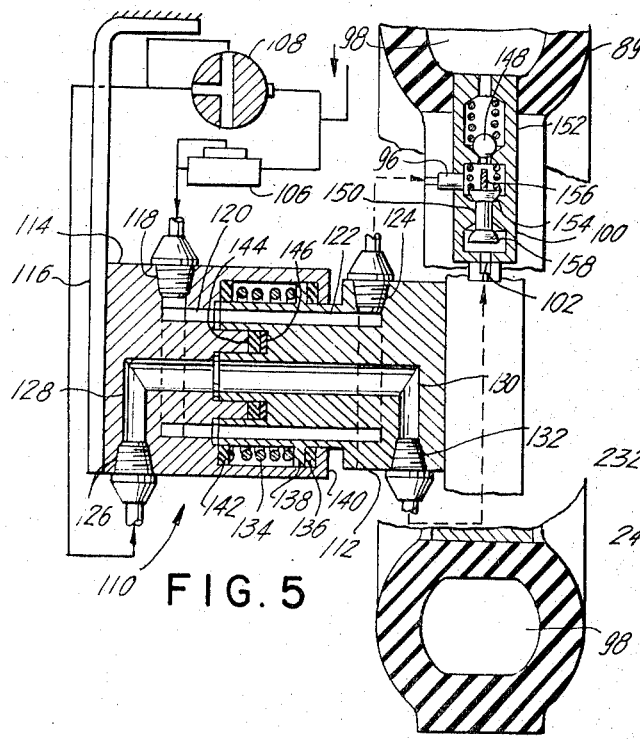
FIG. 5 is a schematic drawing of a skid resisting system utilizing the construction shown in FIG. 4.

FIG. 4 and FIG. 5 illustrate an improvement of the system shown in FIG. 3 wherein the variable pressure manifold is sealed from its pressure source at all times except when the pressure within the manifold is deliberately being varied. This feature prevents continuous leakage through a worn rotary joint that could reduce tire pressure when the vehicle is not in use and the air supply is shut off. Basically, the variable pressure manifold is charged through a check valve with a remotely operated override. When the manifold pressure is lower than the charging pressure, the check valve opens until the manifold and charging pressures are balanced, at which time the check valve closes. If the charging pressure is less than the manifold pressure, the check valve must be opened by remote operation of the override, so that the manifold pressure can exhaust into the charging line until it has been reduced to the desired value.

The segmented tire 89 shown schematically in FIG. 4 and in section in FIG. 5 uses three manifolds. Manifold 90 feeds a set of alternate chambers, 92 through passages 94. Manifold 96 feeds the other set of alternate chambers 98 through controllable check valves 100. Manifold 102 is also connected to check valves 100 to provide the overriding pressure to open the check valves. Manifold 90 and the set of chambers 92 are charged through a tire inflating check valve 104 to a desired pressure. This pressure is not controllable during operation of the vehicle to alter traction characteristics.

Pressures are supplied from an air supply in the vehicle to manifold 96 through pressure regulating valve 106 and to manifold 102 through a three-way valve 108; both valves being connected to the manifolds through a dual rotary joint 110. Rotary joint 110 includes a rotating member 112 attached to the hub of the wheel on which tire 89 is mounted and a non-rotating member 114 attached to the vehicle frame by a bracket 116. From regulating valve 106, air is fed to port 118 and annular passage 120 of non-rotating member 114, from there to annular passage 122 and port 124 of rotating member 112 and finally, to chamber pressurizing manifold 96. From three-way valve 108, air is fed to port 126 and central passage 128 of non-rotating member 114, from there to central passage 130 and port 132 of rotating member 112 and finally to check valve overriding manifold 102. Rotating member 112 and non-rotating member 114 of rotary joint 110 are held firmly together by spring 134. A primary seal is provided between the annular passage and atmosphere by sealing ring 136, which is compressed between flange 138 of rotating member 112 and shoulder 140 of non-rotating member 114. A secondary seal is provided by ring 142. A seal between the central and annular air passages is provided by sealing ring 144 and spring washer 146. Sealing rings 136, 142 and 144 are made of carbon, Teflon or other material, having both good sealing and bearing properties.

Check valve 100 consists of a spring loaded ball valve 148 and a spring loaded overriding piston 150, both located in housing 152. When the air pressure in manifold 102 is lower than that in manifold 96, piston 150 is driven to its lowest or normal position; and its upper conical surface 154 is seated. If the pressure in manifold 96 is higher than that in chamber 98, ball valve 148 is lifted from its seat, and pressurizing air flows from the manifold into the chamber. When chamber 98 is charged to a value slightly under the pressure in manifold 96, the ball valve is seated by its return spring and charging air flow ceases. If the pressure in manifold 96 decreases, the ball valve will remain closed and the pressure in chamber 98 will remain at its previously charged value. In order to relieve chamber 98 so that its pressure can be reduced, piston 150 is actuated to its uppermost, or override position. Pin 156 on piston 150 lifts ball valve 148 from its seat, allowing air to flow from chamber 98 into manifold 96. Piston 150 is actuated by increasing the pressure in manifold 102 until it is sufficiently higher than the pressure in manifold 96. In the normal position, the upper pressure area exposed to manifold 96 is greater than the pressure area exposed to manifold 102, due to seating of the upper conical surface. When the upper conical surface is lifted from its seat, the pressure areas are equal; and the opening force increases, overcoming the resistance of the piston and ball valve springs to lift the ball from its seat. In the override position, the bottom conical surface 158 of piston 150 is seated and the bottom pressure area exposed to manifold 102 is the greater. The pressure in manifold 102 must be lowered substantially below that in manifold 96 for the piston to return to its normal position. This differential between override and restoring pressures in manifold 102 prevents valve chattering and leakage past piston 150. Since one of the conical surfaces of piston 150 is always seated, there can be no leakage between manifolds 96 and 102 except during the very brief period during which the override piston changes position.

In operation, traction is varied by setting the three-way valve at its override position, which applies high pressure directly from the supply to manifold 102. Pressure regulating valve 106 is then adjusted to bring chambers 98 to the proper pressure to provide the desired traction. When this has been achieved, three-way valve 108 is set at its normal position, which exhausts manifold 102 to atmosphere, causing ball valve 148 to close, and retaining the desired pressure in chambers 98.

Figure 6:
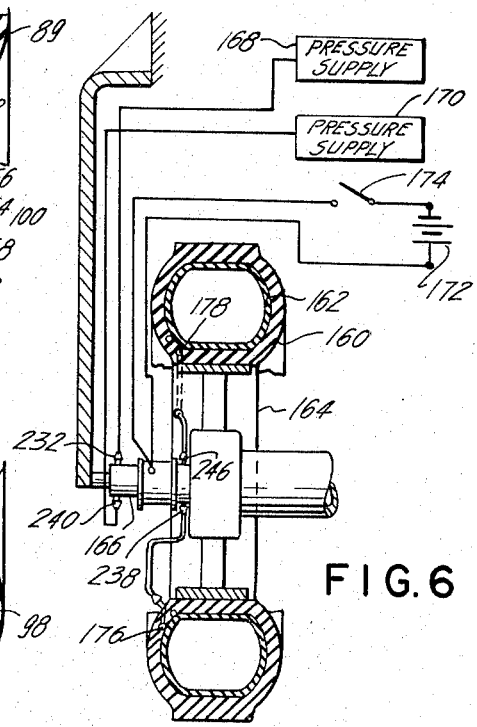
FIG. 6 is a schematic drawing of a skid resisting system utilizing a tire with a segmented inner tube, having two integral air manifolds and also utilizing a dual rotary joint to pressurize the two manifolds.
Figure 7:
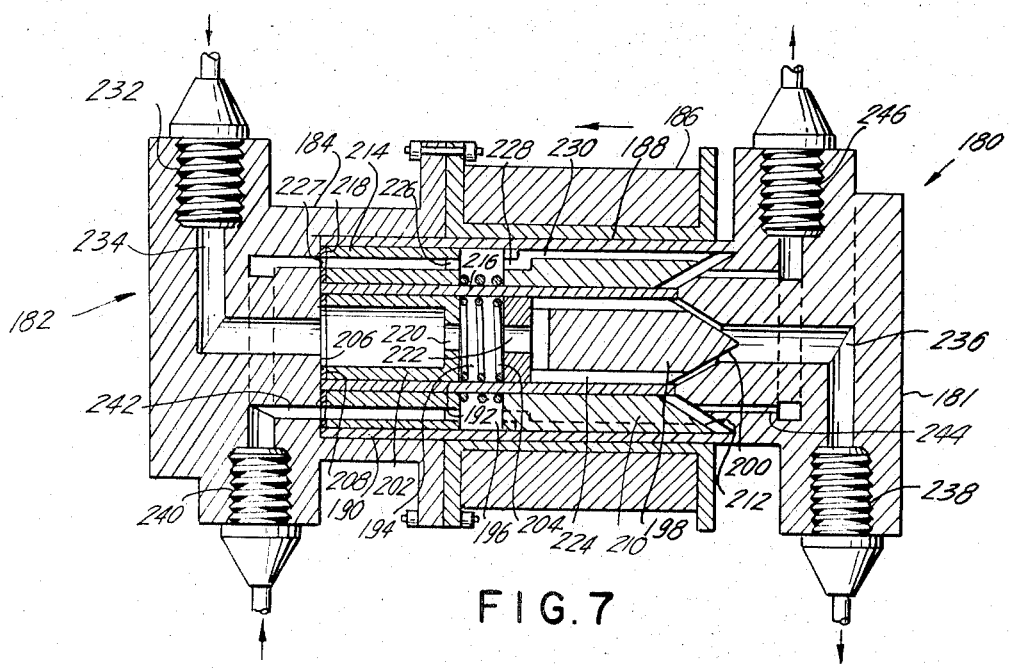
FIG. 7 is a sectional view of the dual rotary joint used in the system of FIG. 6.

A system is shown in FIGS. 6 and 7 that permits remote pressurization of both sets of chambers in a segmented tire from separate air supplies without leakage from the tire when the air supplies are shut down. The system consists of a pneumatic tire 160 with a segmented inner tube 162, shown mounted on a wheel 164, a magnetically operated dual rotary valve 166, two pressure supplies 168 and 170, which pressurize both sets of chambers in the segmented inner tube, and an electrical power supply 172 and a switch 174 to actuate the magnetic rotary valve. Inner tube 162 contains two integral manifold tubes 176 and 178, which fit into recesses in the tire casing.

The magnetic dual rotary valve is shown in section in FIG. 7. It includes a rotating assembly 180 and a non-rotating assembly 182. Non-rotating assembly 182 consists of a non-rotating joint member 184 and a coil assembly 186 mounted co-axially with member 184. Coil assembly 186 and member 184 have internal bores of the same diameter, forming a continuous interior surface 188. Rotating assembly 180 includes a housing 181 with two concentric cylinders 190 and 192, forming a central cylindrical passage 194 and an annular cylindrical passage 196. The outer surface of rotating outer cylinder 190 mates closely with the inner bore surface 188 of non-rotating assembly 182. Central passage 194 contains a cylindrical valve 198 with an external conical seat 200, a hollow cylindrical spacer 202 and a coil spring 204, which separates valve 198 and spacer 202. Rotating spacer 202 bears against surface 206 of non-rotating member 184 through a sealing washer 208. Annular passage 196 contains a hollow cylindrical valve 210 with an internal conical seat 212, a hollow cylindrical spacer 214 and a coil spring 216, which separates valve 210 and spacer 214. Rotating spacer 214 bears against surface 206 of non-rotating member 184 through a sealing washer 218. Spacer 202 has an axial hole 220; and valve 198 has an axial hole 222 and peripheral slots 224 to permit the axial movement of air within the central passage when valve 198 is moved off its seat. Spacer 214 has axial holes 226; washer 218 has axial holes 227, and valve 210 has axial holes 228 and peripheral slots 230 to permit the axial movement of air within the central passage when valve 210 is moved off its seat.

Valves 198 and 210 are made of magnetic material; all other parts of non-magnetic material. When they are seated, rotating valves 198 and 210 are located at one end of coil assembly 186. When the coil is energized, the magnetic valve pieces will be forced into a more central position within the coil, thus moving off their seats and permitting air to flow. When the coil is de-energized, springs 204 and 216 will seat the valves, shutting off air flow.

In operation, when coil assembly 186 is energized by closing switch 174, air flows from pressure supply 168 to port 232 and passage 234 in non-rotating member 184, through spacer 202 and slots 224 of valve 198 into passage 236 of rotating member 181, and from port 238 of member 181 to manifold 176. Air also flows from pressure supply 170 to port 240 and annular passage 242 in non-rotating member 184, through holes 226 in spacer 214 and slots 230 in valve 210 into annular passage 244 in rotating member 181 and from port 246 in member 181 to manifold 178. Thus, when the coil is energized, both sets of chambers in inner tube 162 connected to manifolds 176 and 178 can be independently pressurized to desired levels by manipulation of pressure supplies 168 and 170. When the coil is de-energized the rotating valves are shut and the air in the tire is sealed against leakage.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A skid-resisting system for vehicles, including an inflatable tire with an internal annular volume divided by transverse members into a plurality of first and second sets of alternately spaced chambers, means for varying the resilience of the tire along its circumference, including means for inflating the tire to a first common pressure operatively connected to one of the sets of chambers, and means for inflating the tire to a second common pressure operatively connected to the other of the sets of chambers.

2. A skid-resisting system of the character described in claim 1, in which the inflating means include a first manifold connected to the first set of alternately spaced tire chambers through separate passages, means to connect the first manifold to an air supply, a second manifold connected to the remaining alternately spaced chambers through separate passages, and means to connect the second manifold to an air supply.

3. A skid-resisting system of the character described in claim 2 in which the means connecting the first and second manifolds to air supplies are valves, operable to increase the pressure in a manifold when the supply is a high-pressure source and operable to decrease the pressure in a manifold when the supply is a low-pressure sink.

4. A skid-resisting system of the character described in claim 3 in which the valves are pressure-actuated check valves which open when the supply pressure exceeds the manifold pressure and close when the manifold pressure exceeds the supply pressure, said check valves including mechanical overriding means to open the valve to reduce pressure in the manifold.

5. A skid-resisting system of the character described in claim 2 in which the manifold connecting means are rotary pressure joints to couple the manifolds to non-rotating air supplies.

6. A skid-resisting system of the character described in claim 2 in which the manifold connecting means include rotary pressure joints and valves fixed to the tire and connected between the rotary joints and the manifolds, the valves being remotely operable to apply supply pressures to the manifolds in one position and to seal the manifolds in another position.

7. A skid-resisting system of the character described in claim 2, including an air supply mounted to rotate with the tire, an electrically operated valve between the air supply and one of the manifolds, and a means controller electrically connected to said valve and mounted to rotate with the tire and the air supply to control pressure in the manifold in response to remotely transmitted commands.

8. A skid-resisting system of the character described in claim 2, including a check valve connected to one manifold to inflate one set of tire chambers to a constant pressure and a rotary joint connected to the second manifold to inflate the second set of chambers from a variable pressure source.

9. A skid-resisting system of the character described in claim 1 in which the tire is a tubeless tire with an inflatable casing and the casing is divided into a plurality of chambers.

10. A skid-resisting system of the character described in claim 1 in which the tire includes an inner inflatable tube and the inner tube is divided into a plurality of chambers.

References Cited

UNITED STATES PATENTS

| | | | |
|---|---|---|---|
| 584,218 | 6/1897 | Goddard | 152—417 X |
| 3,194,180 | 7/1965 | Mackerle | 152—334 X |

ARTHUR L. LA POINT, *Primary Examiner.*